(12) United States Patent
Kawanishi

(10) Patent No.: US 8,584,713 B2
(45) Date of Patent: Nov. 19, 2013

(54) LINK APPARATUS, WEIGHING APPARATUS USING A LINK APPARATUS, PACKAGING APPARATUS USING A LINK APPARATUS AND WEIGHING AND PACKAGING SYSTEM USING A LINK APPARATUS

(75) Inventor: Shozo Kawanishi, Nishinomiya (JP)

(73) Assignee: Shozo Kawanishi, Akashi-shi (JP)

( * ) Notice: Subject to any disclaimer, the term of this patent is extended or adjusted under 35 U.S.C. 154(b) by 838 days.

(21) Appl. No.: 12/531,009

(22) PCT Filed: Mar. 12, 2008

(86) PCT No.: PCT/JP2008/000546
§ 371 (c)(1),
(2), (4) Date: Jan. 19, 2010

(87) PCT Pub. No.: WO2008/120451
PCT Pub. Date: Oct. 9, 2008

(65) Prior Publication Data
US 2010/0132833 A1      Jun. 3, 2010

(30) Foreign Application Priority Data
Mar. 16, 2007 (JP) .................................. 2007-068991

(51) Int. Cl.
B65B 1/30      (2006.01)
B65B 1/32      (2006.01)
G01G 13/22    (2006.01)
B65B 3/28     (2006.01)

(52) U.S. Cl.
CPC ........................................ B65B 3/28 (2013.01)
USPC .................. 141/83; 141/145; 177/83; 53/502

(58) Field of Classification Search
USPC ............ 141/83, 144–148; 177/83, 89; 53/502
See application file for complete search history.

(56) References Cited

U.S. PATENT DOCUMENTS 2,054,279 A * 9/1936 Briggs ............................ 53/276
2,387,585 A   10/1945 Howard
(Continued)

FOREIGN PATENT DOCUMENTS

DE   1 120 351 B    12/1961
DE   1 461 896 A1   10/1969
(Continued)

OTHER PUBLICATIONS

International Search Report for PCT/JP2008/000546, mailed Jun. 17, 2008.
(Continued)

Primary Examiner — Timothy L Maust
(74) Attorney, Agent, or Firm — Marshall, Gerstein & Borun LLP

(57) ABSTRACT

A link apparatus for weighing objects from a weighing machine to bags conveyed at high speed, a weighing apparatus and a packing apparatus using the link apparatus, and a weighing and packaging system are disclosed. A link apparatus comprises funnel-shaped chutes supplied with objects through entrances and respectively discharge the objects through exits. A rotary board conveys the chutes along a revolving path where the exits are arranged in one line in a direction along the revolving path. The revolving path includes a first area under which package bags are conveyed in the direction along the revolving path, the first area being a part of the revolving path; wherein the entrances are formed by elongated openings; and the rotary board conveys the chutes such that the exits are located above the package bags in the first area.

18 Claims, 6 Drawing Sheets

(56) References Cited

U.S. PATENT DOCUMENTS

| | | | | |
|---|---|---|---|---|
| 2,616,606 | A | * | 11/1952 | Beehler, Jr. .................. 141/144 |
| 2,753,099 | A | * | 7/1956 | Jenner et al. .................. 177/52 |
| 2,755,007 | A | * | 7/1956 | Knobel .......................... 141/78 |
| 2,859,036 | A | * | 11/1958 | Petrea et al. .................. 271/102 |
| 3,045,720 | A | * | 7/1962 | Jungmayr et al. ............ 141/145 |
| 3,517,480 | A | * | 6/1970 | Pinkham ........................ 53/558 |
| 3,550,650 | A | * | 12/1970 | Yamashita .................... 141/145 |
| 3,967,662 | A | * | 7/1976 | Warner ......................... 141/148 |
| 4,399,880 | A | | 8/1983 | Konishi |
| 5,082,032 | A | * | 1/1992 | Crocker .......................... 141/1 |
| 5,331,792 | A | * | 7/1994 | Kitchen ......................... 53/502 |
| 5,605,183 | A | * | 2/1997 | Hartman et al. ............. 141/237 |
| 6,119,440 | A | | 9/2000 | Benner, Jr. et al. |
| 6,625,961 | B1 | * | 9/2003 | Ogier et al. .................... 53/502 |

FOREIGN PATENT DOCUMENTS

| | | |
|---|---|---|
| EP | 0 269 785 A1 | 6/1988 |
| JP | 07-052918 A | 2/1995 |
| JP | 11-263317 A | 9/1999 |
| JP | 2004-099136 | 4/2004 |
| JP | 2004-257760 | 9/2004 |
| JP | 2006-051977 | 2/2006 |
| JP | 2007-187645 A | 7/2007 |

OTHER PUBLICATIONS

Extended European Search Report for EP 08720432.7, dated May 2, 2013.

* cited by examiner (a)

(b)

US 8,584,713 B2

LINK APPARATUS, WEIGHING APPARATUS USING A LINK APPARATUS, PACKAGING APPARATUS USING A LINK APPARATUS AND WEIGHING AND PACKAGING SYSTEM USING A LINK APPARATUS

BACKGROUND

1. Technical Field

The present invention relates to a link apparatus for linking a weighing machine such as a combination weigher to a packaging machine for carrying out packaging while successively conveying package bags, a weighing apparatus using the link apparatus, a packaging apparatus using the link apparatus, and a weighing and packaging system using the link apparatus.

2. Background Art

Conventionally, there is a weighing and packaging system which charges objects to be packaged having a fixed volume into package bags conveyed successively in a line shape to manufacture package products (e.g., see patent document 1). FIG. 6 shows an example of such a conventional weighing and packaging system. FIG. 6(*a*) is a side view of the conventional weighing and packaging system. FIG. 6(*b*) is a plan view showing major components of the weighing and packaging system.

The weighing and packaging system includes a packaging machine 20 and a powder material supplying device 50 for supplying a powder material as objects to be to be packaged. In the packaging machine 20, an elongate film P is wound back from a film roll (not shown), horizontally conveyed successively via several rollers, and bent in a watershoot shape to have a fold line at a lower side through a film guide 21. The lower end portions of feeding funnels 23 are sequentially inserted into a space of the two-fold film P1. Then, sealing bars 22 (fixing/heating bars 22*a*, tilting levers 22*b*) sequentially sandwich the two-fold film from both sides such that heating surfaces of the fixing/heating bars 22*a* thermally seal the film with a small width in a width direction of the film, thereby forming side seal portions P2 at constant intervals. A number of package bags P3 defined by the side seal portions P2 are formed successively in the longitudinal direction of the film. The package bags P3 are conveyed successively with the lower end portions of the feeding funnels 23 inserted into openings formed at the upper edges of the package bags P3.

The powder material is supplied from the powder material supplying device 50 located above with a constant amount through the openings of measuring cups 54 and is charged into the respective package bags P3 via the feeding funnels 23. The powder material supplying device 50 includes a hopper 51 storing the powder material, a rotary container 52 which receives the powder material through the lower end opening of the hopper 51 and has a flat bottom plate 53, plural tubular measuring cups 54 having a constant volume and penetrating downward through the periphery of the bottom plate 53, a measuring board (not shown) which is fixed on the bottom plate 53 and positioned in close proximity to the upper end opening surfaces of the measuring cups 54 to charge the powder material into the measuring cups 54 precisely up to the upper edges thereof, and shutters 55 for opening and closing the lower end opening surfaces of the measuring cups 54.

The film charged with the powder material in the package bags P3 by the powder material supplying device 50 is conveyed successively and passes through a turn-back roller 24. An upper edge sealing device 25 thermally seals the upper edge portions of the package bags P3 successively to form upper edge seal portions P4, thereby sealing the package bags. The film is further conveyed, and a cutting device 26 perforates the side seal portions P2 to form seams, or cuts them, so that the package bags P3 are sequentially cut and separated away from each other. Thus, the package products are manufactured.

Patent document 1: Japanese Laid-Open Patent Application Publication No. 2004-99136

DISCLOSURE OF THE INVENTION

Problems to be Solved by the Invention

In the above described conventional weighing and packaging system, in the packaging machine 20, the package bags P3 with the lower end portions of the feeding funnels 23 inserted therein are conveyed successively at a high-speed, and the rotary container 52 of the powder material supplying device 50 continuously rotates. Thereby, the measuring cups 54 for supplying the powder material to the package bags P3 and the feeding funnels 23 inserted into the package bags P3 move in a state where the measuring cups 54 and the feeding funnels 23 overlap in the vertical direction, in a package bag charging area IV. This makes it possible to supply the powder material from the measuring cups 54 to the package bags P3 conveyed at a high-speed through the feeding funnels 23 during the movement.

However, in the weighing machine such as the combination weigher which weighs the objects to be weighed such that its weight falls within a predetermined weight range and discharge them, the position of a discharge outlet for the objects to be weighed is fixed. Therefore, it is difficult to supply the objects to be weighed to the packaging machine 20 which successively conveys the package bags at a high-speed as described above. The above described packaging machine 20 is configured to convey the package bags successively so as to draw a circular arc. It is also difficult to supply from the weighing machine the objects to be weighed to a packaging machine which is configured to successively convey the package bags at a high-speed in a straight-line shape.

The present invention has been developed to solve the above mentioned problem, and an object of the present invention is to provide a link apparatus which is capable of supplying objects to be weighed which have been discharged from a weighing machine having a discharge outlet provided in a fixed position to package bags being conveyed successively at a high speed, a weighing apparatus using the link apparatus, a packaging apparatus using the link apparatus, and a weighing and packaging system using the link apparatus.

Means for Solving the Problem

To achieve the above described object, a link apparatus of the present invention comprises plural funnel-shaped chutes which are respectively supplied with objects to be weighed through entrances at upper portions thereof and respectively discharge the objects to be weighed through exits at lower portions thereof; and a conveyor means which conveys the plural chutes along a revolving path in a state where the exits of the respective chutes are arranged in one line in a direction along the revolving path, the revolving path including a first area under which package bags arranged in one line are conveyed in the direction along the revolving path, the first area being a part of the revolving path; wherein the entrances of the chutes are formed by openings which are elongated in the direction along the revolving path; and wherein the conveyor means is configured to convey the chutes such that the exits of the chutes are respectively located above the package bags in the first area.

In accordance with such a configuration, the plural chutes to be conveyed along the revolving path are provided and the entrances of the chutes are formed by the openings which are elongated in the direction along the revolving path. Therefore, the objects to be weighed which have been discharged from the weighing machine having a discharge outlet in a fixed position can be supplied to the entrances of the chutes when the chutes are being conveyed. In the first area, the objects to be weighed which have been supplied from the weighing machine to the entrances of the chutes can be discharged through the exits of the chutes and can be supplied to the package bags located therebelow. As a result, it is possible to supply the objects to be weighed which have been discharged from the weighing machine having the discharge outlet in a fixed position to the package bags being conveyed successively at a high speed.

The conveyor means may be configured to convey the chutes in a state where the entrances of k (k: plural number) chutes whose exits are adjacent to each other are parallel to each other along the revolving path and deviate from each other in the direction along the revolving path.

In accordance with such a configuration, the length of the entrances of the chutes in the direction along the revolving path can be increased.

The plural chutes may be mounted to the conveyor means at a pitch equal to a pitch at which the package bags are arranged in the direction along the revolving path. The conveyor means may be configured to convey the chutes at a speed equal to a speed at which the package bags are conveyed.

The link apparatus may be configured such that every set of n (n: plural number) chutes which are conveyed sequentially to the first area of the revolving path are sequentially supplied with the objects to be weighed to discharge the objects to be weighed from the n chutes supplied with the objects to be weighed to the n package bags.

A weighing apparatus of the present invention comprises the above link apparatus of the present invention and a weighing machine having n (n: plural number) discharge outlets disposed above the first area of the link apparatus, the weighing machine being configured to sequentially discharge the objects to be weighed which have been weighed from the n discharge outlets to sequentially supply the objects to be weighed to every set of n chutes which are conveyed sequentially to the first area of the link apparatus.

In accordance with such a configuration, it is possible to supply the objects to be weighed which have been discharged from the weighing machine having the discharge outlets in fixed positions to the package bags being conveyed successively at a high speed, by using the link apparatus of the present invention.

The weighing machine may be configured to divide the objects to be weighed into plural groups and weigh the objects to be weighed for each of the plural groups, determine n combinations each having a total weight falling within a predetermined weight range, from the groups for which the objects to be weighed have been weighed, and configured to discharge, from the n discharge outlets, the objects to be weighed in the groups which are selected to form the n combinations.

A packaging apparatus of the present invention comprise the link apparatus of the present invention and a packaging machine which successively conveys the package bags arranged in one line under the first area of the link apparatus.

In accordance with such a configuration, it is possible to supply the objects to be weighed which have been discharged from the weighing machine having the discharge outlets in fixed positions to the package bags being conveyed successively at a high speed, by using the link apparatus of the present invention.

A weighing and packaging system of the present invention comprises the above link apparatus of the present invention and a weighing machine having n (n: plural number) discharge outlets disposed above the first area of the link apparatus, the weighing machine being configured to sequentially discharge the objects to be weighed which have been weighed from the n discharge outlets to sequentially supply the objects to be weighed to every set of n chutes which are conveyed sequentially to the first area of the link apparatus; and a packaging machine which successively conveys the package bags arranged in one line under the first area of the link apparatus.

In accordance with such a configuration, it is possible to supply the objects to be weighed which have been discharged from the weighing machine having the discharge outlets in fixed positions to the package bags being conveyed successively at a high speed, by using the link apparatus of the present invention.

The packaging machine may include plural funnels which are conveyed under the first area of the link apparatus in a state where the funnels are respectively inserted into the package bags and guide the objects to be weighed which have been discharged from the chutes of the link apparatus to inside of the package bags.

Thereby, the objects to be weighed which have been discharged from the chutes are supplied to the package bags through the funnels. Thus, the objects to be weighed easily enter the package bags.

Effects of the Invention

The present invention has the above described configuration and achieves advantages that it is possible to provide a link apparatus which is capable of supplying the objects to be weighed which have been discharged from the weighing machine having the discharge outlets in fixed positions to the package bags being conveyed successively at a high speed, a weighing apparatus using the link apparatus, a packaging apparatus using the link apparatus, and a weighing and packaging system using the link apparatus.

The above and further objects, features and advantages of the present invention will more fully be apparent from the following detailed description of preferred embodiments with accompanying drawings.

Figure 1:
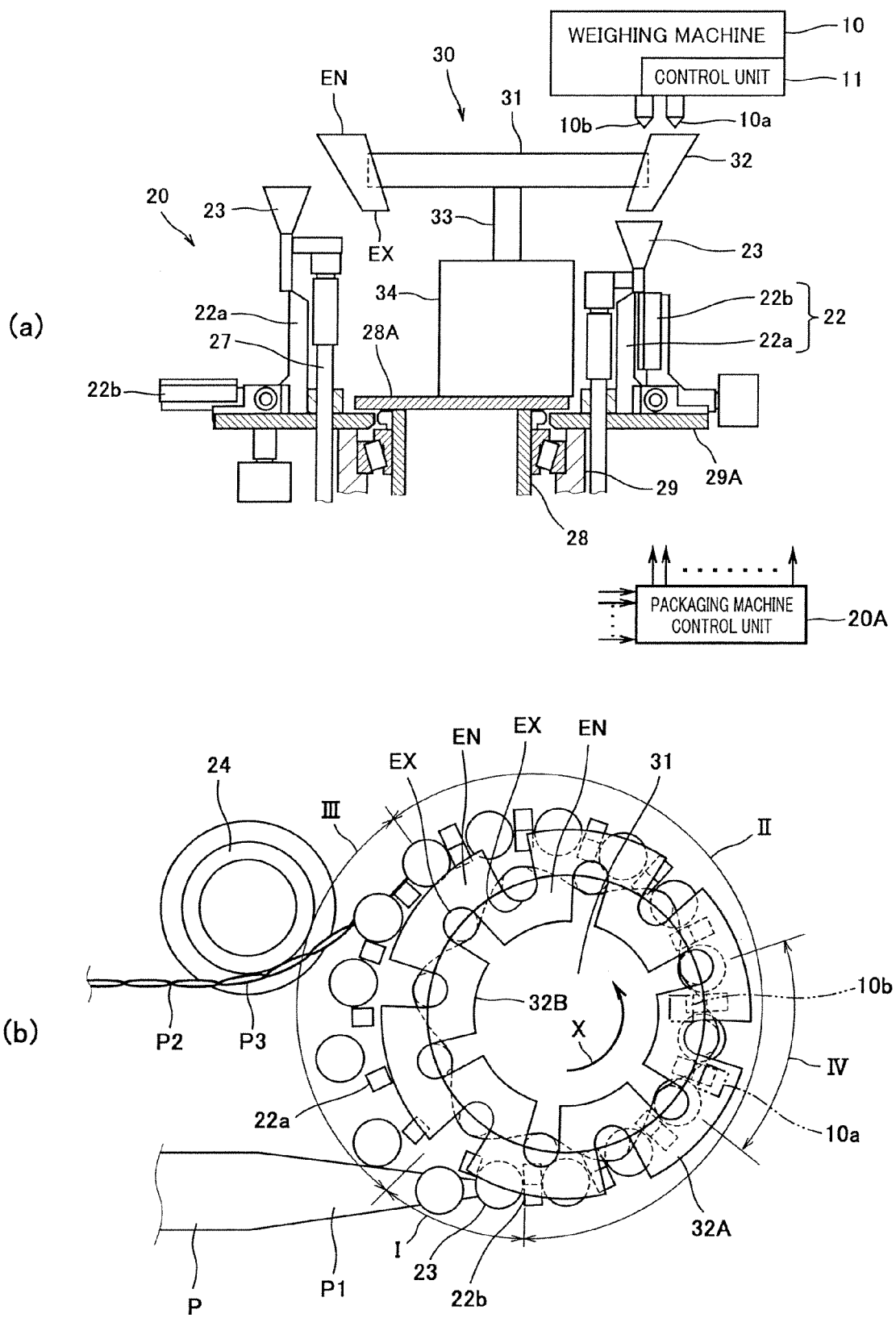
FIG. 1(a) is a side view showing a schematic configuration of major components of a weighing and packaging system using a link apparatus according an embodiment of the present invention.
FIG. 1(b) is a plan view schematically showing major components of the weighing and packaging system.

EXPLANATION OF REFERENCE NUMERALS 10 weighing machine
10a, 10b discharge outlet of weighing machine
11 control unit of weighing machine
20 packaging machine
20A packaging machine control unit
23 feeding funnel
30 link apparatus
31 rotary board
32 chute
33 rotary shaft
34 drive unit

BEST MODE FOR CARRYING OUT THE INVENTION

Hereinafter, preferred embodiments of the present invention will be described with reference to the drawings.

FIG. 1(a) is a side view showing a schematic configuration of major components of a weighing and packaging system using a link apparatus according an embodiment of the present invention, and FIG. 1(b) is a plan view schematically showing major components of the weighing and packaging system.

A weighing and packaging system of this embodiment comprises a weighing machine 10 constituted by, for example, a combination weigher, a packaging machine 20, and a link apparatus 30.

The link apparatus 30 has a rotary board 31, and a number of funnel-shaped chutes 32 (32A, 32B) are attached to the peripheral edge of the rotary board 31. When the rotary board 31 rotates, the two chutes 32 are moved into a package bag charging area IV, and the objects to be weighed are discharged from discharge outlets 10a and 10b of the weighing machine 10 to the two chutes 32.

The weighing machine 10 has two discharge outlets 10a and 10b. Through the respective discharge outlets 10a and 10b, the objects to be weighed (e.g., powder material such as sugar) within a specified weight range are discharged. The discharge outlets 10a and 10b are disposed at an arrangement pitch equal to, for example, an arrangement pitch of the chutes 32 above the package bag charging area IV.

The packaging machine 20 has a configuration similar to that of the conventional example. The packaging machine 20 is configured such that plural sealing bars 22 (fixing/heating bars 22a, tilting levers 22b) revolve while opening and closing, and the plural feeding funnels 23 revolve while moving up and down and being swung inward and outward.

In the packaging machine 20, as shown in FIG. 1, a rotary tubular body 29 is supported to a fixed cylindrical base 28 such that the tubular body 29 is rotatable around the cylindrical base 28, and is driven to rotate.

The plural sealing bars 22 are mounted to a ring-shaped board 29A fixed to an upper end of the rotary tubular body 29 so that the side seal portions P2 of the film P1 are formed at a predetermined pitch. The sealing bars 22 revolve around the rotary tubular body 29 according to the rotation of the rotary tubular body 29. During the revolving movement of the sealing bars 22, when the tilting seal bars 22b are closed, the fixing/heating bars 22a and the tilting seal bars 22b sandwich the film P1 and the heating surfaces of the fixing/heating bars 22a thermally seal the film with a small width in a width direction of the film, thereby forming the side seal portions P2. When the tilting seal bars 22b are opened, the film P1 can be separated away from the fixing/heating bars 22a.

The feeding funnels 23 are mounted to up-down shafts 27 by arms fixed to the upper end portions of the up-down shafts 27. The up-down shafts 27 are respectively inserted into through-holes provided in the ring-shaped board 29A at the upper end of the rotary tubular body 29 at a predetermined pitch and revolve around the rotary tubular body 29 according to the rotation of the rotary tubular body 29. The up-down shafts 27 are configured to be movable up and down and to be rotatable while revolving. Thereby, the feeding funnels 23 revolve along with the up-down shafts 27 to which the feeding funnels 23 are mounted. When the up-down shafts 27 move up and down, the feeding funnels 23 move up and down, while when the up-down shafts 27 rotate, the feeding funnels 23 are swung inward or outward.

The packaging machine 20 includes a packaging machine control unit 20A. The packaging machine control unit 20A is constituted by, for example, a microcomputer and controls the operation of the entire packaging machine 20.

In the packaging machine 20, the elongate film P is wound back from the film roll (not shown), horizontally conveyed successively via several rollers, and bent in a watershoot shape to have a fold line at a lower side through the film guide 21 (see FIG. 6), forming the two-fold film P1. Meanwhile, the feeding funnels 23 revolve and move up in an area III, where the feeding funnels 23 are swung outward. Thereafter, in an area I, the feeding funnels 23 are swung inward while moving down, allowing the lower end portions of the feeding funnels 23 to be sequentially inserted into a space of the two-fold film P1, and the feeding funnels 23 move in the same direction that the film P1 moves.

Then, in an area II, the feeding funnels 23 are maintained in a down position and the tilting seal bars 22b are sequentially closed. Thereby, the sealing bars 22 sequentially sandwich the two-fold film P1 from both sides to form the side seal portions P2 at constant intervals, so that a number of package bags P3 are formed successively in the longitudinal direction of the film such that the package bags are defined by the side seal portions P2 and their upper edge portions are open. The feeding funnels 23 are maintained in a state where the lower end portions thereof are inserted into the openings at the upper edge portions of the package bags P3.

Within the area II where the feeding funnels 23 are in the down position, the objects to be weighed which have been discharged from the weighing machine 10 are charged into the package bags P3 through the chutes 32 and the feeding funnels 23, during a period in which the discharge outlets of the chutes 32 of the link apparatus 30 are located right above the inlets of the feeding funnels 23 (package bag charging area IV).

Figure 6:
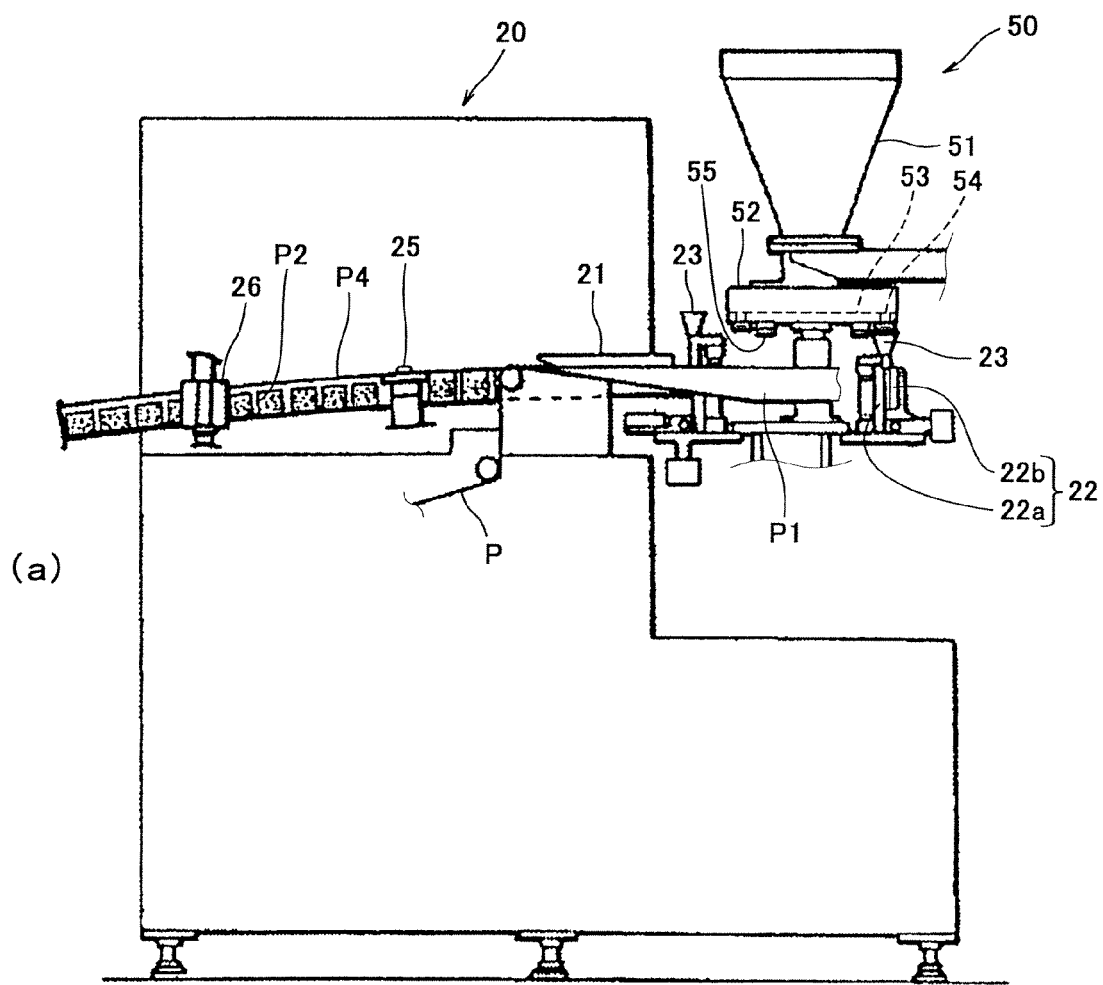
FIG. 6(a) is a side view of a conventional weighing and packaging system.
FIG. 6(b) is a plan view showing major components of the weighing and packaging system.
Figure 6:
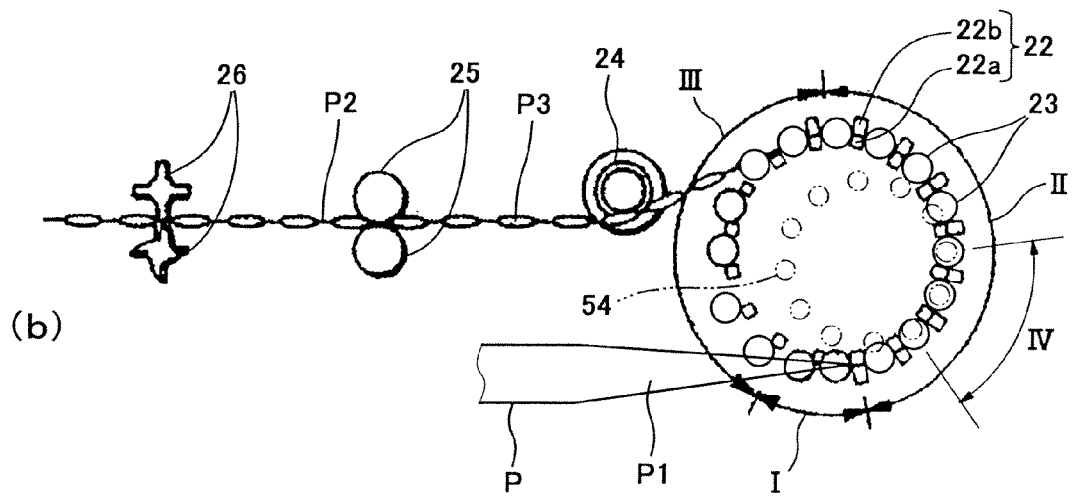

The film, the package bags P3 of which have been charged with the objects to be packaged (in this embodiment, the objects to be weighed which have been discharged from the weighing machine 10) in the package bag charging area IV, are conveyed successively. In the area III, the feeding funnels 23 move up and the tilting seal bars 22b are open, so that the film is separated away from the fixing/heating bars 22a. Then, the film passes through the turn-back roller 24. Then, as shown in FIG. 6, the upper edge sealing device 25 thermally seals the upper edge portions of the package bags P3 successively to form upper edge seal portions P4, sealing the package bags. Then, the film is further conveyed, and the cutting device 26 perforates the side seal portions P2 to form seams, or cuts them, so that the package bags P3 are sequentially cut and separated away from each other. Thus, package products are manufactured.

The link apparatus 30 is fixed on a horizontal board 28A mounted to the upper end of the cylindrical base 28 of the packaging machine 20. The link apparatus 30 includes the rotary board 31, a number of funnel-shaped chutes 32 (32A, 32B) disposed at the peripheral edge portion of the rotary board 31, a rotary shaft 33 for rotating the rotary board 31, and a drive unit 34. The drive unit 34 includes a motor (not shown) for driving the rotary shaft 33. To rotate the rotary shaft 33 using the motor, a known configuration may be used. The chutes 32 are fastened to the rotary board 31 by threaded engagement, welding, or the like. Whereas only the two chutes 32 (32A) are schematically shown in FIG. 1(a), a number of chutes 32 (32A, 32B) are actually disposed at the peripheral edge portion of the rotary board 31 as shown in FIG. 1(b).

The chutes 32(32A, 32B) are fastened to the rotary board 31. According to the rotation of the rotary board 31, the chutes 32 revolve along the peripheral edge portion of the rotary board 31. Each chute 32 is a funnel-shaped, and has at an upper portion thereof an entrance EN for the objects to be weighed, which is formed by an opening elongated in the revolving direction, and an exit EX which is connected to the entrance EN and is formed by a small opening at a lower portion thereof, to discharge therethrough the objects to be weighed which have been fed through the entrance EN.

The exits EX of respective chutes 32 are located on the circumference. The respective chutes 32 are configured such that a revolving path of the exits EX overlap with a conveying path of the feeding funnels 23 in the package bag charging area IV. Therefore, the exits EX of the chutes 32 pass through above the conveying path of the feeding funnels 23 in the package bag charging area IV. The chutes 32 whose exits are adjacent are arranged such that the entrance EN of the chute 32A is located outside and the entrance EN of the chute 32B is located inside. The exits EX of the chute 32A and the chute 32B are arranged alternately on the circumference. The arrangement pitch of the chutes 32 (distance between the centers of the exits EX of the chutes 32 whose exits are adjacent) is set equal to the arrangement pitch (=arrangement pitch of the package bag P3) of the feeding funnels 23 passing through the package bag charging area IV.

The rotary board 31 rotates in the direction indicated by an arrow X in FIG. 1(b). In the package bag charging area IV, the rotary board 31 rotates such that the chutes 32 are conveyed while maintaining a state where the exits of the chutes 32 are respectively located right above the feeding funnels 23. Therefore, in the package bag charging area IV, the rotary board 31 rotates so that the conveying speed of the chutes 32 is equal to the conveying speed (=conveying speed of the package bags P3) of the feeding funnels 23. The rotational speed of the motor for driving the rotary shaft 33 is set so that the rotary board 31 rotates in the above described manner.

As shown in FIG. 1(b), the discharge outlet 10a of the weighing machine 10 is located above the moving path of the entrance EN of the chute 32A while the exit EX is passing through the package bag charging area IV, while the discharge outlet 10b of the weighing machine 10 is located above the moving path of the entrance EN of the chute 32B while the exit EX is passing through the package bag charging area IV.

Figure 2:
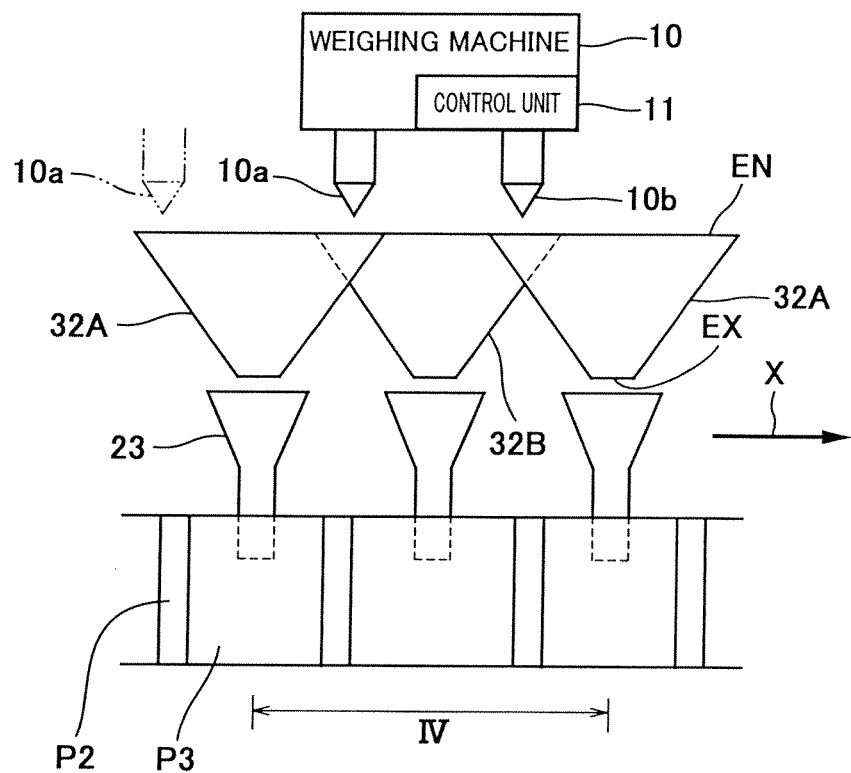
FIG. 2 is a side view schematically showing discharge outlets of a weighing machine, chutes of the link apparatus, feeding funnels of a packaging machine and package bags in a package bag charging area.

FIG. 2 is a side view schematically showing the discharge outlets of the weighing machine 10, the chutes 32 of the link apparatus 30, the feeding funnels 23 of the packaging machine 20 and the package bags P3 in the package bag charging area IV. FIG. 2 illustrates that the film (package bags) of a circular-arc shape as viewed from above is extended in a straight line shape. The chutes 32, the feeding funnels 23 and the package bags P3 are conveyed at an equal speed in the direction indicated by an arrow X. In FIG. 2, the sealing bars 22 for forming the side seal portions P2 are not illustrated.

In the weighing machine 10, for example, when the chutes 32A and 32B are conveyed in the direction of the arrow X, the objects to be weighed are discharged from the discharge outlet 10a in a period (time period T1) in which the relative position of the discharge outlet 10a with respect to the chute 32A at the left in FIG. 2 shifts from a position indicated by a solid line to a position indicated by a dotted line. The same occurs in the discharge outlet 10b, and the objects to be weighed are discharged from the discharge outlet 10b in the same time period T1.

The weighing machine 10 is configured to discharge the objects to be weighed simultaneously from the two discharge outlets 10a and 10b in this embodiment. In a case where the position of the discharge outlet 10a with respect to the entrance EN of the chute 32A in the arrow X direction deviates from the position of the discharge outlet 10b with respect to the entrance EN of the chute 32B in the arrow X direction, the objects to be weighed may be discharged from the two discharge outlets 10a and 10b at different timings according to the deviation. Whereas there is a gap between the entrances EN of the chutes 32A whose inlets are arranged outside, the length of the entrances EN in the revolving direction may be increased to eliminate the gap. Likewise, whereas there is a gap between the entrances EN of the chutes 32B whose inlets are arranged inside, the length of the entrances EN in the revolving direction may be increased to eliminate the gap.

A control circuit (expressed as a control circuit A) is built into the drive unit 34 of the link apparatus 30 to control the operation of the drive unit 34. The control circuit A is a control circuit of the motor for driving the rotary shaft 33.

A control unit 11 of the weighing machine 10 is constituted by, for example, a microcomputer, and is configured to control the operation of the link apparatus 30 via the control circuit A as well as the operation of the weighing machine 10.

The operation speed (driving speed: e.g., the number of package bags manufactured per minute=the number of times the objects to be weighed corresponding to one package bag are discharged per minute) is set in the control unit 11 using an input means (not shown) of the weighing machine. The control unit 11 controls the weighing machine 10 and the link apparatus 30 so that the weighing machine 10 and the link apparatus 30 operate according to the set operation speed.

The control unit 11 outputs a specified signal (hereinafter referred to as a "weighing operation signal") to the packaging machine control unit 20A at a specified timing in the operation repeated in the weighing machine 10, for example, when the weighing machine 10 is ready to discharge the objects to be weighed, or discharges the objects to be weighed. Thus, the weighing operation signal is output to the packaging machine control unit 20A in an operation cycle (cycle: TM) according to the operation speed, while the normal operation is performed.

The operation speed (driving speed: e.g., the number of package bags manufactured per minute) is set in the packaging machine control unit 20A using an input means (not shown) of the packaging machine. The packaging machine control unit 20A controls the packaging machine 20 according to the set operation speed. The feeding funnels 23 are conveyed at a predetermined speed according to the operation speed along with the package bags P3 within the area II.

The packaging machine control unit 20A outputs a specified signal (hereinafter referred to as a "packaging operation signal") to the control unit 11 of the weighing machine at a specified timing in the operation repeated in the packaging machine 20, for example, when the tilting seal bars 22b are sequentially closed. Thus, the packaging operation signal is output to the control unit 11 of the weighing machine in the operation cycle (cycle: Tp) according to the operation speed, while the normal operation is performed.

In a case where an equal operation speed (driving speed) is set in the control unit 11 of the weighing machine 10 and in the packaging machine control unit 20A, the operation cycle (TM) of the weighing machine 10 is twice as long as the operation cycle (Tp) of the packaging machine 20, because the weighing machine 10 discharges the objects to be weighed corresponding to two package bags in one operation cycle. Conversely, the operation cycle (Tp) of the packaging machine 20 is ½ as long as the operation cycle (TM) of the weighing machine 10.

The packaging machine control unit 20A checks whether or not the weighing operation signal is received from the weighing machine 10 once in every time which is twice as long as the operation cycle (Tp) of the packaging machine 20, and causes the packaging machine 20 to continue the operation. If the weighing operation signal is retarded, the packaging machine control unit 20A causes the packaging machine 20 to temporarily stop the operation (stand-by) until the weighing operation signal is received.

The control unit 11 of the weighing machine 10 checks whether or not the packaging operation signal is received from the packaging machine 20 once in every time which is ½ as long as the operation cycle (TM) of the weighing machine 10, and causes the weighing machine 10 and the link apparatus 30 to continue the operation. If the packaging operation signal is retarded, the control unit 11 causes the weighing machine 10 and the link apparatus 30 to temporarily stop the operation (stand-by) until the packaging operation signal is received.

The operation start position and the operation stop position are preset in the link apparatus 30 and the packaging machine 20. The operation start position and the operation stop position are set so that the feeding funnels 23 are located right under the respective chutes 32 in the state shown in FIG. 1(b), i.e., in the package bag charging area IV. During the operation of the weighing and packaging system, an equal operation speed (driving speed) is set in the control unit 11 of the weighing machine 10 and in the packaging machine control unit 20A.

In accordance with the setting, in the packaging machine 20, the feeding funnels 23 and the package bags P3 are conveyed at a constant speed according to the set operation speed. In the link apparatus 30, the rotary board 31 rotates so that the chutes 32 are conveyed while maintaining a state where the chutes 32 are located right above the feeding funnels 23 in the package bag charging area IV. For example, as shown in FIG. 1(b), in a case where the number of the chutes 32 of the link apparatus 30 is twelve and the number of the feeding funnels 23 of the packaging machine 20 is sixteen, the rotational speed of the rotary board 31 for causing the chutes 32 to revolve is 4/3 (=16/12) times as high as the rotational speed of the rotary tubular body 29 for causing the feeding funnels 23 to revolve. Since the rotary board 31 and the rotary tubular body 29 rotate at this speed, the chutes 32 and the feeding funnels 23 are conveyed in a state where the feeding funnels 23 are always located right below the chutes 32 in the package bag charging area IV.

Figure 3:
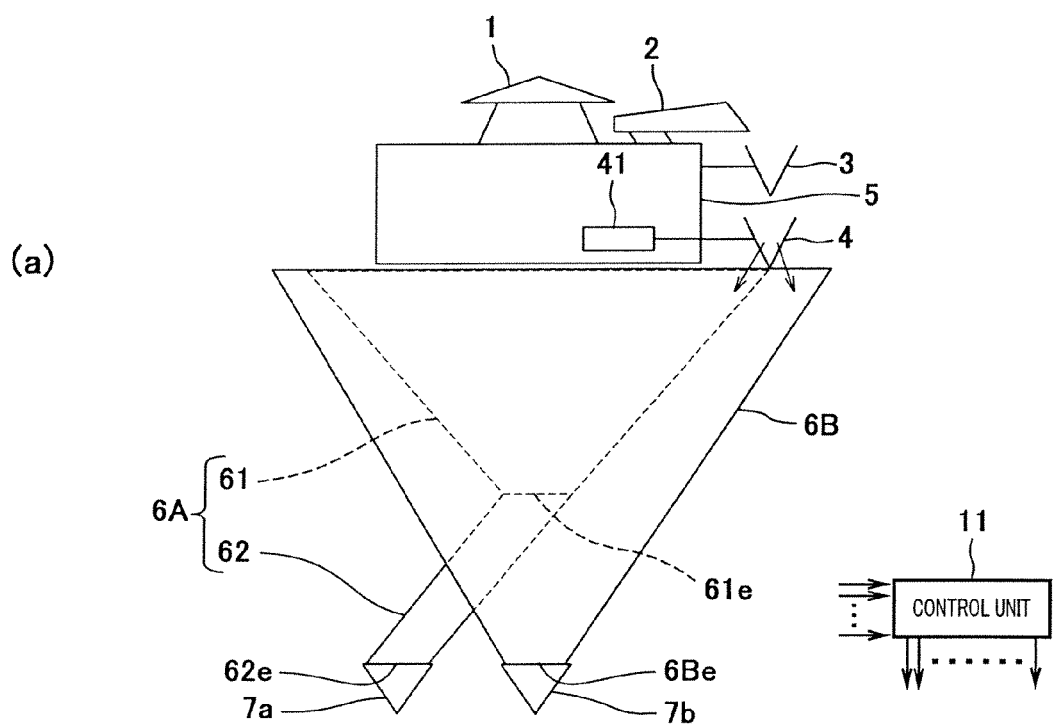
FIG. 3(a) is a schematic view of a weighing machine having two discharge outlets as viewed from the side, which is partly in cross-section.
FIG. 3(b) is a schematic view of an inner chute, an outer chute, and weighing hoppers of the weighing machine as viewed from above.
Figure 3:
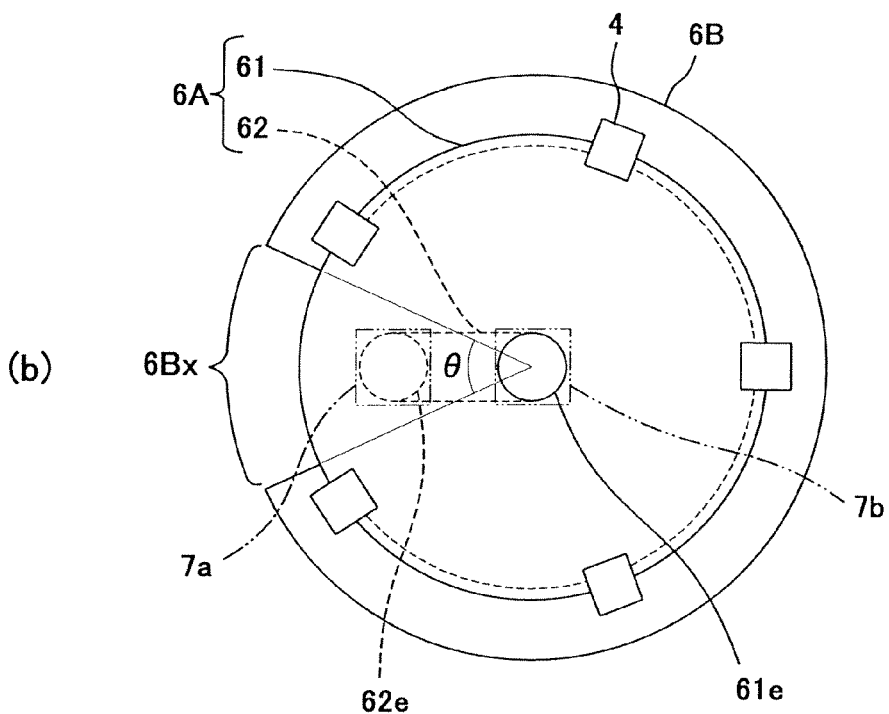

FIG. 3 shows an example of the weighing machine 10 having two discharge outlets 10a and 10b.

FIG. 3(a) is a schematic view of the weighing machine 10 having the two discharge outlets 10a and 10b as viewed from the side, which is partly in cross-section, and FIG. 3(b) is a schematic view of an inner chute, an outer chute, and weighing hoppers of the weighing machine 10 as viewed from above.

The weighing machine 10 shown in FIG. 3 is a combination weigher. As shown in FIG. 3(a), a dispersion feeder 1 having a conical shape is mounted to an upper part of a center base body (body) 5 provided at a center of the machine to radially disperse by vibration the objects to be weighed supplied from an external supplying device. Around the dispersion feeder 1, plural linear feeders 2 are provided to transfer by vibration the objects to be weighed which have been received from the dispersion feeder 1 into respective feeding hoppers 3. Plural feeding hoppers 3 and plural weighing hoppers 4 are disposed below the linear feeders 2 and are arranged in a circular-arc shape around the center base body 5 in such a manner that each feeding hopper 3 and each weighing hopper 4 correspond to the associated one of the linear feeders 2. The dispersion feeder 1, the linear feeders 2, the feeding hoppers 3 and the weighing hoppers 4 are mounted to the center base body 5. Each weighing hopper 4 is attached with a weight sensor 41 such as a load cell for measuring the weight of the objects to be weighed inside the weighing hopper 4. Each weight sensor 41 outputs a measurement value to the control unit 11.

As shown in FIG. 3(b), the feeding hoppers 3 and the weighing hoppers 4 are arranged in a circular-arc shape in a region except for a region corresponding to a central angle θ, and the linear feeders 2 are disposed to respectively correspond to the feeding hoppers 3.

An inner chute 6A and an outer chute 6B are disposed below the weighing hoppers 4 arranged in a circular-arc shape. Each weighing hopper 4 is configured to have a gate for discharging the objects to be weighed to the inner chute 6A and a gate for discharging the objects to be weighed to the outer chute 6B to selectively discharge the objects to be weighed to the inner chute 6A or to the outer chute 6B.

The outer chute 6B has a structure in which a chute having a substantially inverted conical shape is provided with a cut portion 6Bx corresponding to the portion where no weighing hopper 4 is provided. A collecting hopper 7b is provided at a discharge outlet 6Be at a bottom part thereof. The objects to be weighed are discharged from the weighing hoppers 4 to the outer chute 6B, slide down on the outer chute 6B, and are held for some time in the collecting hopper 7b. After that, the objects to be weighed are discharged.

The inner chute 6A includes a chute 61 which is disposed inside the outer chute 6B and has a substantially inverted conical shape, and a pipe 62 which is a tubular chute provided at a discharge outlet 61e of the chute 61. The pipe 62 is disposed to pass through the cut portion 6Bx of the outer chute 6B such that a discharge outlet 62e thereof is located below the cut portion 6Bx outside the outer chute 6B. A collecting hopper 7a is provided at a discharge outlet 62e of the pipe 62. The objects to be weighed are discharged from the weighing hoppers 4 to the inner chute 6A, slide down on the chute 61, pass through the pipe 62, and are held for some time in the collecting hopper 7a. After that, the objects to be weighed are discharged.

In this case, the control unit 11 controls the operation of the entire combination weigher and the operation of the link apparatus, and performs a combination process. In the combination process, the control unit 11 performs combination calculation based on the weight values of the objects to be weighed inside the weighing hoppers 4 which are measured by the respective weight sensors 41 to determine two combinations (discharge combinations) of the weighing hoppers 4 in which a total of the weight values of the objects to be weighed falls within a predetermined weight range (allowable range with respect to a target weight value) from among the plural weighing hoppers 4, and determines one of the discharge combinations as a combination for discharging the object to be weighed to the inner chute 6A and the other as a combination for discharging the object to be weighed to the outer chute 6B.

In the combination weigher, the objects to be weighed are supplied from an external supplying device to the dispersion feeder 1 and are supplied from the dispersion feeder 1 to each feeding hopper 3 via the associated liner feeder 2. Each feeding hopper 3 feeds the objects to be weighed to the associated weighing hopper 4. The weight sensor 41 measures the weight of the objects to be weighed which have been fed to each weighing hopper 4, and outputs a measurement value to the control unit 11. The control unit 11 performs the combination process to determine two discharge combinations simultaneously. The control unit 11 causes the weighing hoppers 4 forming one discharge combination to discharge the objects to be weighed to the inner chute 6A, and at the same time, causes the weighing hoppers 4 forming the other discharge combination to discharge the objects to be weighed to the outer chute 6B. Thereby, the objects to be weighed are supplied to the collecting hoppers 7a and 7b. The feeding hopper 3 feeds the objects to be weighed to the weighing hopper 4 which has discharged the objects to be weighed and is now empty. The liner feeder 2 feeds the objects to be weighed to the feeding hopper 3 which is empty.

The control unit 11 causes the collecting hoppers 7a and 7b to simultaneously discharge the objects to be weighed at a predetermined timing.

The collecting hoppers 7a and 7b of the combination weigher correspond to the discharge outlets 10a and 10b of the weighing machine 10 of FIG. 1. For example, the objects to be weighed which have been discharged from the collecting hopper 7a are supplied to the chute 32A of the link apparatus 30, and then are charged into the package bag P3 from the chute 32A via the feeding funnel 23 of the packaging machine 20. In the same manner, the objects to be weighed which have been discharged from the collecting hopper 7b are supplied to the chute 32B, and are then charged into the package bag P3 from the chute 32B via the feeding funnel 23.

Whereas in the above described combination weigher, the two discharge combinations are determined simultaneously, the discharge combination for discharging the objects to be weighed to the inner chute 6A and the discharge combination for discharging the objects to be weighed to the outer chute 6B may be determined sequentially, the weighing hoppers 4 forming the respective discharge combinations may sequentially discharge the objects to be weighed, and the respective collecting hoppers 7a and 7b may sequentially discharge the objects to be weighed.

Since the link apparatus 30 of this embodiment is provided with the plural chutes 32 conveyed along the revolving path, and the entrances EN of the chutes 32 are formed by the openings which are elongated in the direction along the revolving path, the objects to be weighed which have been discharged from the discharge outlets 10a and 10b of the weighing machine 10, which are provided in fixed positions, can be supplied to the entrances EN of the respective chutes 32 when the chutes 32 are being conveyed. In the package bag charging area IV (first area), the objects to be weighed which have been supplied to the entrances EN of the respective chutes 32 from the discharge outlets 10a and 10b of the weighing machine 10 are discharged from the exits EX of the respective chutes 32 and are supplied to the package bags P3 located therebelow. Therefore, it is possible to supply the objects to be weighed which have been discharged from the weighing machine 10 having discharge outlets in fixed positions to the package bags P3 being conveyed successively at a high speed.

It is sufficient that the length of the entrances EN of the chute 32 in the direction along the revolving path is set longer than a value obtained by multiplying the conveying speed of the chute 32 by the time taken to receive in the chute 32 the objects to be weighed which have been discharged once from the weighing machine 10.

The rotary board 1 may be replaced by a configuration in which the chute 32 is allowed to revolve along an endless conveyer belt such as a chain. For example, plural sprockets may be disposed in predetermined positions, the endless conveyer belt such as a chain may be set in the plural sprockets, plural chute retaining members respectively retaining the chutes 32 may be coupled to the endless conveyer belt at constant intervals, and a part of the sprockets may be driven by the motor. A guide rail or the like may be provided to guide the chute retaining members so that the chutes 32 stably passes along a predetermined revolving orbit.

In the case of using the above described conveyer belt, the revolving orbit of the chute 32 is not limited to a circular orbit, but may be an oval orbit or other revolving orbit.

In the case of using the packaging machine configured to convey the package bags successively in a straight line shape at a high speed, the chutes 32 may be configured to revolve along the endless conveyer belt such as the chain.

As described later, the weighing machine 10 may be configured to have three or more discharge outlets.

Subsequently, an example of the above described modification will be described.

FIG. 4(a) is a plan view showing arrangement of the chutes of the link apparatus in the package bag charging area and its vicinity in a case where the packaging machine is configured to convey the package bags in a straight-line shape and the weighing machine 10 has even-number discharge outlets.

The chutes 32 (32a to 32d, etc) of the link apparatus is conveyed in a direction indicated by an arrow Y at a speed equal to the speed (=the conveying speed of the package bags P3) at which the feeding funnels 23 of the packaging machine are conveyed. The arrangement pitch of the chutes 32 (distance between the centers of the exits EX of the chutes 32 whose exits are adjacent) is set equal to the arrangement pitch (=arrangement pitch of the package bag P3) of the feeding funnels 23. In at least a package bag charging area (F2, F4), the chutes 32 and the feeding funnels 23 are conveyed in the direction of the arrow Y in a state where the exits EX of the chutes 32 are located right above the feeding funnels 23. After passing through the package bag charging area (F2, F4), the chutes 32 revolve such that they are conveyed to move counterclockwise (to the left) and enter the package bag charging area (F2, F4) again.

In the configuration of FIG. 4(a), for example, a chain 91 is disposed to extend inside and along the revolving orbit of the exits EX of the chutes 32, and chute retaining members 92A for retaining the chute 32a and 32c or the like whose entrances EN are located in a range from the revolving orbit of the exits EX to an outward region, and chute retaining members 92B for retaining the chutes 32b and 32d or the like whose entrances EN are located in a range from the revolving orbit of the exits EX to an inward region, are coupled to the upper side of the chain 91 such that the chute retaining member 92A and the chute retaining member 92B are arranged alternately at constant intervals. A guide rail 93 is provided to retain the end portions of the chute retaining members 92A and 92B which are at an opposite side of the end portions thereof coupled to the chain 91 such that the end portions are slidable therealong. For example, the chute retaining members 92A and 92B are plate-like members provided with openings each of which serves to retain the associated chute 32 in an intermediate position between the entrance EN and the exit EX of the chute 32. The chutes 32 are fastened to the chute retaining members 92A and 92B by an appropriate method (e.g., welding or threaded engagement). The guide rail 93 is located outside along the revolving orbit of the exits EX of the chutes 32. For example, as shown within a circle 100 of FIG. 4(a), the guide rail 93 has a U-shaped cross section and the end portions of the chute retaining members 92 (92A, 92B) which are at an opposite side of the end portions thereof coupled to the chain 91 are inserted into the U-shaped recess (groove) and are slidably retained therein. The chain 91 is set to form the revolving path using the plural sprockets (not shown), and a part of the sprockets are configured to be driven by the motor.

In a case where the weighing machine 10 has two discharge outlets and the package bag charging area is the area F2, for example, the discharge outlets of the weighing machine 10 are disposed in two positions 4a and 4b above the region where the chutes 32 pass. From the time point when the head portions of the entrances EN at the upper portions of the chutes 32 in the conveying direction indicated by the arrow Y pass through right below the positions 4a and 4b of the discharge outlets of the weighing machine 10 (in the state shown in FIG. 4(a)), the weighing machine 10 starts to discharge the objects to be weighed through the two discharge outlets. By the time the tail portions of the entrances EN of the chutes 32 in the conveying direction have passed through the region right below the positions 4a and 4b of the discharge outlets of the weighing machine 10, the weighing machine 10 completes discharging the objects to be weighed through the two discharge outlets.

In this case, the weighing machine 10 operates so as to discharge the objects to be weighed simultaneously through the two discharge outlets. After the weighing machine 10 has discharged the objects to be weighed to the two chutes 32a and 32b, it discharges the objects to be weighed to the following two chutes 32c and 32d.

In a case where the weighing machine 10 has four discharge outlets and the package bag charging area is the area F4, for example, the discharge outlets of the weighing machine 10 are disposed in four positions 4a to 4d above the region where the chutes 32 pass. From the time point when the head portions of the entrances EN at the upper portions of the chutes 32 in the conveying direction indicated by the arrow Y pass through right below the positions 4a, 4b, 4c, and 4d of the discharge outlets of the weighing machine 10 (in the state shown in FIG. 4(a)), the weighing machine 10 starts to discharge the objects to be weighed through the four discharge outlets. By the time the tail portions of the entrances EN of the chutes 32 in the conveying direction have passed through the region right below the positions 4a, 4b, 4c, and 4d of the discharge outlets of the weighing machine 10, the weighing machine 10 completes discharging the objects to be weighed through the four discharge outlets.

In this case, the weighing machine 10 operates so as to discharge the objects to be weighed simultaneously through the four discharge outlets. After the weighing machine 10 has discharged the objects to be weighed to the four chutes 32a to 32d, it discharges the objects to be weighed to the four chutes 32 following the chutes 32a to 32d.

In the case of the weighing machine 10 which is used with the link apparatus shown in FIG. 4(a) and has two discharge outlets, for example, the combination weigher shown in FIG. 3 may be used.

In the case of the weighing machine 10 which is used with the link apparatus shown in FIG. 4(a) and has four discharge outlets, for example, two combination weighers each of which is the one shown in FIG. 3 may be provided.

FIG. 4(b) is a plan view showing arrangement of the chutes of the link apparatus in the package bag charging area and its vicinity in a case where the packaging machine is configured to convey the package bags in a straight-line shape and the weighing machine has discharge outlets which are as many as a multiple of 3.

The chutes 32 (32e to 32j, etc) of the link apparatus are conveyed in the arrow Y direction at a speed equal to the conveying speed (=conveying speed of the package bags P3) of the feeding funnels 23 of the packaging machine. The arrangement pitch of the chutes 32 (distance between the centers of the exits EX of the chutes 32 whose exits are adjacent) is set equal to the arrangement pitch of the feeding funnels 23. In at least the package bag charging area (F3, F4), the chutes 32 and the feeding funnels 23 are conveyed in the direction of the arrow Y in a state where the exits EX of the chutes 32 are respectively located right above the feeding funnels 23. After passing through the package bag charging area (F3, F6), the chutes 32 revolve such that they are conveyed to move counterclockwise (to the left) and enter the package bag charging area (F3, F6) again. In this way, the chutes 32 may be configured to revolve as in the configuration of FIG. 4(a).

In a case where the weighing machine 10 has three discharge outlets and the package bag charging area is the area F3, for example, the discharge outlets of the weighing machine 10 are disposed in three positions 4e, 4f, and 4g above the region where the chutes 32 pass. From the time point when the head portions of the entrances EN at the upper portions of the chutes 32 in the conveying direction indicated by the arrow Y pass through right below the positions 4e, 4f, and 4g of the discharge outlets of the weighing machine 10 (in the state shown in FIG. 4(b)), the weighing machine 10 starts to discharge the objects to be weighed through the three discharge outlets. By the time the tail portions of the entrances EN of the chutes 32 in the conveying direction have passed through the region right below the positions 4e, 4f and 4g of the discharge outlets of the weighing machine 10, the weighing machine 10 completes discharging the objects to be weighed through the three discharge outlets.

In this case, the weighing machine 10 operates so as to discharge the objects to be weighed simultaneously through the three discharge outlets. After the weighing machine 10 has discharged the objects to be weighed to the three chutes 32*e*, 32*f*, and 32*g*, it discharges the objects to be weighed to the following three chutes 32*h*, 32*i*, and 32*j*.

In a case where the weighing machine 10 has six discharge outlets and the package bag charging area is the area F6, for example, the discharge outlets of the weighing machine 10 are disposed in sixth positions 4*e* to 4*j* above the region where the chutes 32 pass. From the time point when the head portions of the entrances EN at the upper portions of the chutes 32 in the conveying direction indicated by the arrow Y pass through right below the positions 4*e* to 4*j* of the discharge outlets of the weighing machine 10 (in the state shown in FIG. 4(*b*)), the weighing machine 10 starts to discharge the objects to be weighed through the six discharge outlets. By the time the tail portions of the entrances EN of the chutes 32 in the conveying direction have passed through the region right below the positions 4*e* to 4*j* of the discharge outlets of the weighing machine 10, the weighing machine 10 completes discharging the objects to be weighed through the six discharge outlets.

In this case, the weighing machine 10 operates so as to discharge the objects to be weighed simultaneously through the six discharge outlets. After the weighing machine 10 has discharged the objects to be weighed to the six chutes 32*e* to 32*j*, it discharges the objects to be weighed to the six chutes 32 following the chutes 32*e* to 32*j*.

Figure 4:
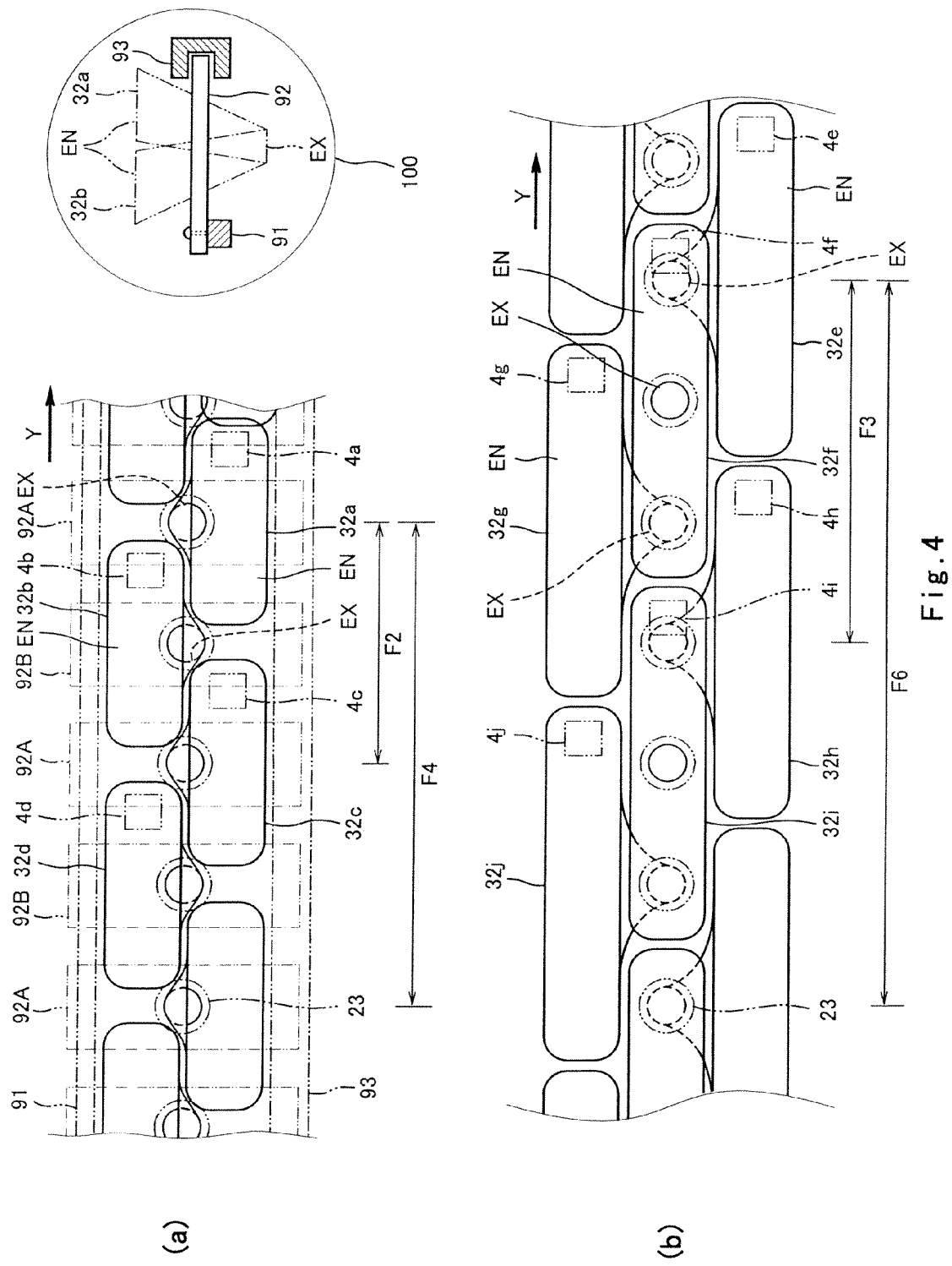
FIG. 4(a) is a plan view showing arrangement of the chutes of the link apparatus in the package bag charging area and its vicinity in a case where the packaging machine is configured to convey the package bags in a straight-line shape and the weighing machine is configured to have even-number discharge outlets.
FIG. 4(b) is a plan view showing arrangement of the chutes of the link apparatus in the package bag charging area and its vicinity in a case where the packaging machine is configured to convey the package bags in a straight-line shape and the weighing machine is configured to have discharge outlets which are as many as a multiple of 3.
Figure 5:
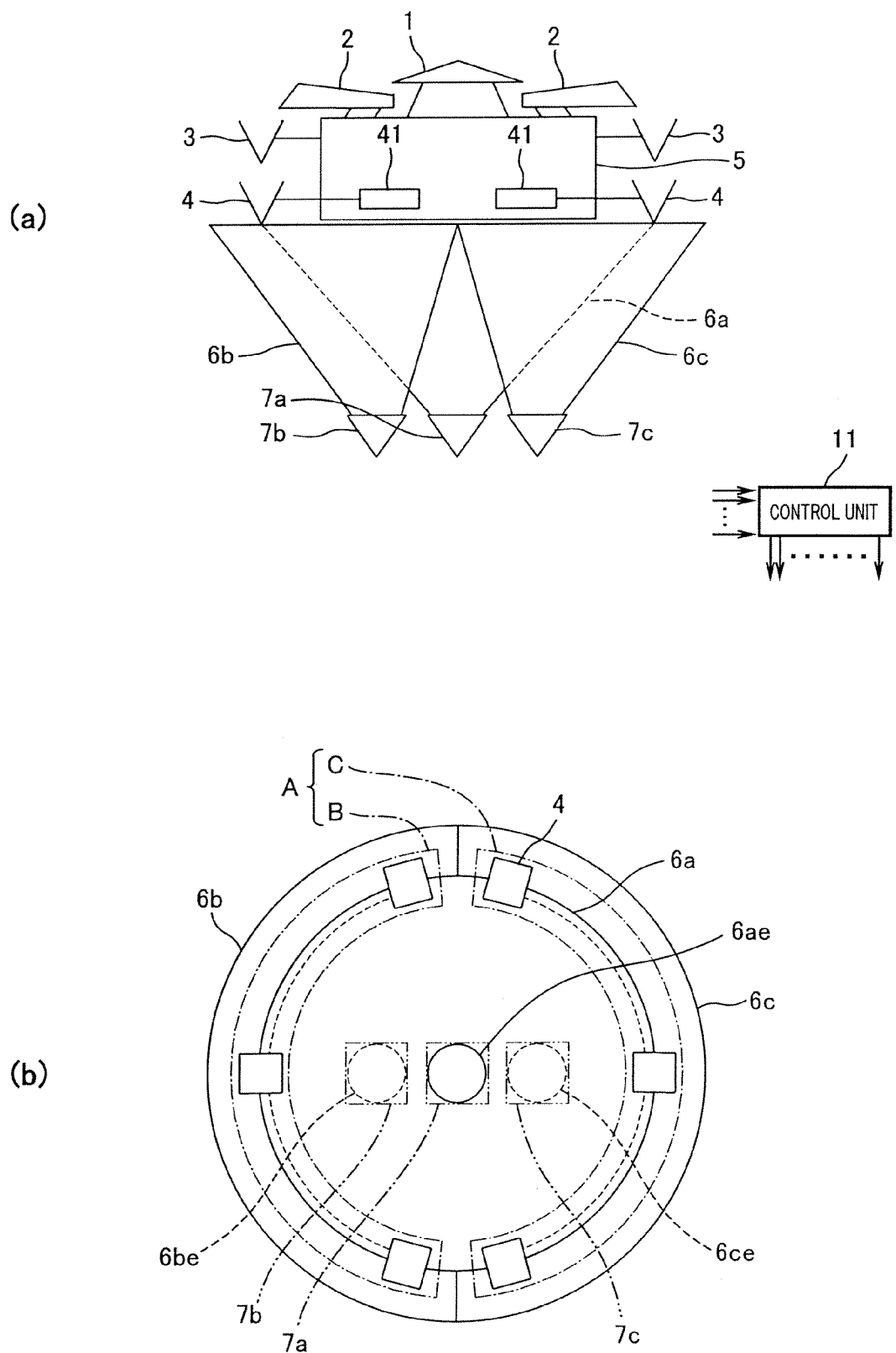
FIG. 5(a) is a schematic view of a weighing machine having three discharge outlets as viewed from the side, which is partly in cross-section.
FIG. 5(b) is a schematic view of an inner chute, outer chutes, and weighing hoppers of the weighing machine as viewed from above.

FIG. 5 shows an example of the weighing machine 10 which is used with the link apparatus shown in FIG. 4(*b*) and has three discharge outlets.

FIG. 5(*a*) is a schematic view of the weighing machine 10 having three discharge outlets as viewed from the side, which is partly in cross-section, and FIG. 5(*b*) is a schematic view of collecting chutes (an inner chute and two outer chutes), and weighing hoppers of the weighing machine 10 as viewed from above.

The combination weigher is identical to the weighing machine shown in FIG. 3 in the dispersion feeder 1, the linear feeders 2, the feeding hoppers 3, the weighing hoppers 4, the weight sensors 41 and the center base body 5. It should be noted that the linear feeders 2, the feeding hoppers 3 and the weighing hoppers 4 are arranged in a circular shape.

Below the weighing hoppers 4 arranged in the circular shape, an inner chute 6*a* having a substantially inverted truncated cone shape is disposed, and two outer chutes 6*b* and 6*c* being divided two parts and having upper openings concentric with the inner chute 6*a* are arranged around the inner chute 6*a*. Each weighing hopper 4 is configured to have a gate for discharging the objects to be weighed to the inner chute 6*a* and a gate for discharging the objects to be weighed to the outer chute 6*b* or 6*c* to selectively discharge the objects to be weighed to the inner chute 6*a* or to the outer chute 6*b* or 6*c* located therebelow.

A group B of the weighing hoppers 4 disposed above the outer chute 6*b* is a group corresponding to the outer chute 6*b* and a group C of the weighing hoppers 4 disposed above the outer chute 6*c* is a group corresponding to the outer chute 6*c*. Each of the groups includes, for example, nine or ten weighing hoppers 4. A group A including the weighing hoppers 4 belonging to the group B and the group C is a group of the weighing hoppers 4 corresponding to the inner chute 6*a*. Collecting hoppers 7*a*, 7*b* and 7*c* are disposed at discharge outlets 6*ae*, 6*be*, and 6*ce* at the bottom parts of the inner chute 6*a* and the outer chutes 6*b* and 6*c*, respectively. The objects to be weighed which have been discharged from the weighing hoppers 4 to the chutes 6*a*, 6*b*, and 6*c* are held for some time in the associated collecting hoppers 7*a*, 7*b* and 7*c* and are respectively thereafter discharged.

The control unit 11 controls the operation of the entire combination weigher and the operation of the link apparatus, and performs the combination process. In the combination process, the control unit 11 determines the combination (discharge combination) of the weighing hoppers 4 for discharging the objects to be weighed to each of the inner chute 6*a* and the outer chutes 6*b* and 6*c*. Each discharge combination is a combination of the weighing hoppers 4 in which a total of the weight values of the objects to be weighed falls within a predetermined weight range (allowable range with respect to a target weight value). For example, the control unit 11 performs combination calculation based on the weight values (measurement values obtained using the weight sensors 41) of the objects to be weighed inside the weighing hoppers 4 in the group B disposed above the outer chute 6*b* to determine a discharge combination of the weighing hoppers 4 in which a total of the weight values of the objects to be weighed falls within a predetermined weight range (allowable range with respect to a target weight value) and is closest to the target weight value, as the discharge combination for discharging the object to be weighed to the outer chute 6*b*. In the same manner, the control unit 11 performs combination calculation based on the weight values of the objects to be weighed inside the weighing hoppers 4 in the group C disposed above the outer chute 6*c* to determine a discharge combination for discharging the objects to be weighed to the outer chute 6*c*. Furthermore, in the same manner, the control unit 11 performs combination calculation based on the weight values of the objects to be weighed inside the weighing hoppers 4 which belong to the group A made up of the whole weighing hoppers 4 and which are other than those in the groups B and C which have been selected to form the discharge combinations, to determine a discharge combination for discharging the objects to be weighed to the inner chute 6*a*.

In the manner as described above, the control unit 11 performs the combination process to determine the three discharge combinations simultaneously. The control unit 11 causes the weighing hoppers 4 belonging to the respective discharge combinations to respectively discharge the objects to be weighed to the inner chute 6*a* and to the outer chutes 6*b* and 6*c* simultaneously. As a result, the objects to be weighed are supplied to the collecting hoppers 7*a*, 7*b* and 7*c*.

Then, the control unit 11 causes the collecting hoppers 7*a*, 7*b*, and 7*c* to discharge the objects to be weighed simultaneously at a specified timing.

The collecting hoppers 7*a*, 7*b* and 7*c* of the combination weigher serve as the three discharge outlets of the weighing machine 10. For example, the collecting hopper 7*b* is disposed at the position 4*e* shown in FIG. 4(*b*), the collecting hopper 7*a* is disposed at the position 4*f* shown in FIG. 4(*b*), and the collecting hopper 7*c* is disposed at the position 4*g* shown in FIG. 4(*b*). The objects to be weighed which have been discharged from the collecting hoppers 7*a*, 7*b* and 7*c* are supplied to the respective chutes 32 of the link apparatus shown in FIG. 4(*b*). Then, the objects to be weighed are charged from the respective chutes 32 into the package bags through the feeding funnels 23 of the packaging machine.

Whereas the combination weigher is configured to determine the three discharge combinations simultaneously, it may be configured to sequentially determine the discharge combination for discharging the objects to be weighed to the outer chute 6*b*, the discharge combination for discharging the objects to be weighed to the inner chute 6*a*, and the discharge combination for discharging the objects to be weighed to the outer chute 6*c*, to cause the weighing hoppers 4 belonging to the discharge combinations to sequentially discharge the objects to be weighed, and to cause the collecting hoppers 7b, 7a, and 7c to sequentially discharge the objects to be weighed.

In the case of the weighing machine 10 which is used with the link apparatus shown in FIG. 4(b) and has six discharge outlets, for example, two combination weighers, each of which is the one shown in FIG. 5, may be provided.

In the case of the weighing machine 10 which is used with the link apparatus shown in FIG. 4(a) and has four discharge outlets, a combination weigher having a configuration described below may be used.

For example, it is supposed that in the configuration shown in FIG. 5, the inner chute 6a is divided into two chutes (hereinafter referred to as "first and second inner chutes") respectively corresponding to the outer chutes 6b and 6c and having their discharge outlets, and the collecting hoppers are respectively provided at the discharge outlets of the first and second inner chutes. To be specific, the group B of the weighing hoppers 4 is a group corresponding to the first inner chute and the outer chute 6b, while the group C of the weighing hoppers 4 is a group corresponding to the second inner chute and the outer chute 6c. In the combination process, two discharge combinations are selected from the group B of the weighing hoppers 4, one of the discharge combinations is determined as a discharge combination for discharging the objects to be weighed to the first inner chute, and the other discharge combination is determined as a discharge combination for discharging the objects to be weighed to the outer chute 6b. In addition, two discharge combinations are selected from the group C of the weighing hoppers 4, one of the discharge combinations is determined as a discharge combination for discharging the objects to be weighed to the second inner chute, and the other discharge combination is determined as a discharge combination for discharging the objects to be weighed to the outer chute 6c.

In the manner as described above, the control unit 11 performs the combination process to determine the four discharge combinations simultaneously. The control unit 11 causes the weighing hoppers 4 corresponding to the respective discharge combinations to discharge the objects to be weighed to the first and second inner chutes and to the outer chutes 6b and 6c simultaneously. As a result, the objects to be weighed are supplied to the four collecting hoppers.

Then, the control unit 11 causes the four collecting hoppers to discharge the objects to be weighed simultaneously at a specified timing.

The four collecting hoppers of the combination weigher correspond to the four discharge outlets of the weighing machine 10. For example, the four collecting hoppers are respectively disposed in the positions 4a to 4d shown in FIG. 4(a) such that one collecting hopper corresponds to one position. The objects to be weighed which have been discharged from the respective collecting hoppers are supplied to the respective chutes 32 of the link apparatus shown in FIG. 4(a). Then, the objects to be weighed are charged from the respective chutes 32 into the package bags through the feeding funnels 23 of the packaging machine. In this case, also, the control unit 11 may be configured to sequentially determine the four discharge combinations, cause the weighing hoppers 4 belonging to the respective discharge combinations to sequentially discharge the objects to be weighed, and cause the four collecting hoppers to sequentially discharge the objects to be weighed.

Whereas the entrances EN at the upper portions of the chutes 32 of the link apparatus are arranged in two lines along the direction (conveying direction) in which the chutes 32 revolve in the configuration of FIG. 1 and FIG. 4(a), and they are arranged in three lines in the configuration of FIG. 4(b), they may be configured to be arranged in four or more lines.

In the above embodiments, each chute 32 of the link apparatus may be provided with an opening and closing means such as a shutter capable of opening and closing the exit EX of the chute 32 or the gate used in the feeding hopper of the combination weigher. In this case, for example, each chute 32 is configured to operate so as to close the opening and closing means in a position outside the package bag charging area IV and so as to open the opening and closing means in a position within the package bag charging area IV, making it possible that the discharge outlet of the weighing machine 10 is set in a position outside the package bag charging area IV. In this case, the weighing machine 10 discharges the objects to be weighed in the position outside the package bag charging area IV and each chute 32 opens the opening and closing means while passing through the package bag charging area IV, enabling charging of the objects to be weighed into the package bags through the feeding funnel 23.

In the above embodiments, the configuration of the weighing machine or the like may be altered in various ways. One example will be described below.

For example, the combination weigher may be configured such that the collecting hoppers are not provided at the discharge outlets of the collecting chutes (inner chute, outer chute). In this case, the discharge outlet of the collecting chute serves as the discharge outlet of the weighing machine, and the objects to be weighed which have been discharged from the weighing hoppers 4 selected to form the discharge combination slide down on the collecting chute and are directly supplied to the feeding funnels 23 of the packaging machine.

In the examples of FIG. 3 and FIG. 5, the combination weigher is configured to have only the weighing hoppers 4 as the hoppers (combination hoppers) which are used in the combination calculation. However, the configuration of the hoppers used in the combination calculation may be changed in various ways so long as the hoppers are configured to discharge the objects to be weighed whose total weight value falls within a predetermined weight range. In one example of the configuration of the hoppers, memory hoppers may be provided below the weighing hoppers 4 to respectively correspond to the weighing hoppers 4, and may be fed with the objects to be weighed which have been weighed from the associated weighing hoppers 4, and each of the weighing hoppers 4 may be configured to discharge the objects to be weighed to the associated memory hopper or to the collecting chute. In this case, the control unit 11 of the combination weigher may perform the combination calculation based on the weight values of the objects to be weighed which are held in the respective weighing hoppers 4 and the weight values of the objects to be weighed which are held in the respective memory hoppers, to determine a combination of the weighing hoppers 4 and/or the memory hoppers in which a total of the weight values of the objects to be weighed falls within a predetermined weight range and may determine it as the discharge combination.

Whereas in the above described combination weigher, the combination hoppers used in the combination are arranged in a circular shape, the configuration of the combination hoppers is not limited to this. For example, the combination hoppers may be arranged in an oval shape, a polygon shape such as a square shape or a rectangular shape, or in a straight-line shape.

The combination weigher may be replaced by a weighing machine configured to weigh the objects to be weighed and to discharge the objects to be weighed from respective of plural discharge outlets.

The weighing machine such as the combination weigher may be configured to have a single discharge outlet for the objects to be weighed, and plural weighing machines may be configured to respectively discharge the objects to be weighed to the plural chutes 32.

In the above described embodiments, the control unit 11 of the weighing machine may be configured to control the link apparatus. In this case, a weighing apparatus configured to include the link apparatus and the weighing machine is provided. Alternatively, the link apparatus may be configured to be controlled by the packaging machine control unit 20A rather than the control unit 11 of the weighing machine. In this case, a packaging apparatus configured to include the link apparatus and the packaging machine is provided.

The control unit 11 of the weighing machine and the packaging machine control unit 20A are each constituted by, for example, a microcomputer. These control units need not be each constituted by a single controller but may be constituted by plural controllers which are distributed and cooperate to control the operation of the weighing apparatus.

The link apparatus need not be provided separately from the packaging machine. Instead, the packaging machine may be configured to have a function of the link apparatus. For example, in the configuration of FIG. 1, without providing the link apparatus 30, the openings at the upper portions of the feeding funnels 23 of the packaging machine 20 may have a shape elongated in the direction in which the feeding funnels 23 revolve, and the weighing machine may directly discharge the objects to be weighed to the feeding funnels 23 in the package bag charging area.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a link apparatus capable of supplying objects to be weighed which have been discharged from a weighing machine having a discharge outlet in a fixed position, to package bags being conveyed successively at a high speed, a weighing apparatus using the link apparatus, a packaging apparatus using the link apparatus, and a weighing and packaging system using the link apparatus.

The invention claimed is:

1. A link apparatus comprising:
    plural funnel-shaped chutes which are respectively supplied with objects to be weighed through entrances at upper portions thereof and respectively discharge the objects to be weighed through exits at lower portions thereof; and
    a conveyor means which conveys the plural chutes along a revolving path in a state where the exits of the respective chutes are arranged in one line in a direction along the revolving path and the entrances of the respective chutes are arranged in plural lines in the direction along the revolving path, the revolving path including a first area under which package bags arranged in one line are conveyed in the direction along the revolving path, the first area being a part of the revolving path;
    wherein the entrances of the chutes are formed by openings which are elongated in the direction along the revolving path;
    wherein the conveyor means is configured to convey the chutes such that the exits of the chutes are respectively located above the package bags in the first area; and
    wherein each of the chutes is provided with an opening and closing means.

2. The link apparatus according to claim 1, wherein
    the conveyor means is configured to convey the chutes in a state where the entrances of k (k: plural number) chutes whose exits are adjacent to each other are parallel to each other along the revolving path and deviate from each other in the direction along the revolving path.

3. The link apparatus according to claim 1, wherein
    the plural chutes are mounted to the conveyor means at a pitch equal to a pitch at which the package bags are arranged in the direction along the revolving path; and
    wherein the conveyor means is configured to convey the chutes at a speed equal to a speed at which the package bags are conveyed.

4. The link apparatus according to claim 1, being configured such that every set of n (n: plural number) chutes which are conveyed sequentially to the first area of the revolving path are sequentially supplied with the objects to be weighed to discharge the objects to be weighed from the n chutes supplied with the objects to be weighed to the n package bags.

5. A weighing apparatus comprising:
    the link apparatus according to claim 1; and
    a weighing machine having n (n: plural number) discharge outlets disposed above the first area of the link apparatus, the weighing machine being configured to sequentially discharge the objects to be weighed which have been weighed from the n discharge outlets to sequentially supply the objects to be weighed to every set of n chutes which are conveyed sequentially to the first area of the link apparatus.

6. The weighing apparatus according to claim 5, wherein
    the weighing machine is configured to divide the objects to be weighed into plural groups and weigh the objects to be weighed for each of the plural groups, determine n combinations each having a total weight falling within a predetermined weight range, from the groups for which the objects to be weighed have been weighed, and configured to discharge, from the n discharge outlets, the objects to be weighed in the groups which are selected to form the n combinations.

7. A packaging apparatus comprising:
    the link apparatus according to claim 1; and
    a packaging machine which successively conveys the package bags arranged in one line under the first area of the link apparatus.

8. A weighing and packaging system comprising:
    the link apparatus according to claim 1;
    a weighing machine having n (n: plural number) discharge outlets disposed above the first area of the link apparatus, the weighing machine being configured to sequentially discharge the objects to be weighed which have been weighed from the n discharge outlets to sequentially supply the objects to be weighed to every set of n chutes which are conveyed sequentially to the first area of the link apparatus; and
    a packaging machine which successively conveys the package bags arranged in one line under the first area of the link apparatus.

9. The weighing and packaging system according to claim 8, wherein the packaging machine includes plural funnels which are conveyed under the first area of the link apparatus in a state where the funnels are respectively inserted into the package bags and guide the objects to be weighed which have been discharged from the chutes of the link apparatus to inside of the package bags.

10. A link apparatus comprising:

plural funnel-shaped chutes which are respectively supplied with objects to be weighed through entrances at upper portions thereof and respectively discharge the objects to be weighed through exits at lower portions thereof; and a conveyor means which conveys the plural chutes along a revolving path in a state where the exits of the respective chutes are arranged in one line in a direction along the revolving path and the entrances of the respective chutes are arranged in plural lines in the direction along the revolving path, the revolving path including a first area under which package bags arranged in one line are conveyed in the direction along the revolving path, the first area being a part of the revolving path;

wherein the entrances of the chutes are formed by openings which are elongated in the direction along the revolving path;

wherein the conveyor means is configured to convey the chutes such that the exits of the chutes are respectively located above the package bags in the first area; and wherein the exits of each of the chutes are arranged in a center of the entrance relative to the direction along the revolving path when viewed from above.

11. The link apparatus according to claim 10, wherein the conveyor means is configured to convey the chutes in a state where the entrances of k (k: plural number) chutes whose exits are adjacent to each other are parallel to each other along the revolving path and deviate from each other in the direction along the revolving path.

12. The link apparatus according to claim 10, wherein the plural chutes are mounted to the conveyor means at a pitch equal to a pitch at which the package bags are arranged in the direction along the revolving path; and wherein the conveyor means is configured to convey the chutes at a speed equal to a speed at which the package bags are conveyed.

13. The link apparatus according to claim 10, being configured such that every set of n (n: plural number) chutes which are conveyed sequentially to the first area of the revolving path are sequentially supplied with the objects to be weighed to discharge the objects to be weighed from the n chutes supplied with the objects to be weighed to the n package bags.

14. A weighing apparatus comprising:

the link apparatus according to claim 10; and a weighing machine having n (n: plural number) discharge outlets disposed above the first area of the link apparatus, the weighing machine being configured to sequentially discharge the objects to be weighed which have been weighed from the n discharge outlets to sequentially supply the objects to be weighed to every set of n chutes which are conveyed sequentially to the first area of the link apparatus.

15. The weighing apparatus according to claim 14, wherein the weighing machine is configured to divide the objects to be weighed into plural groups and weigh the objects to be weighed for each of the plural groups, determine n combinations each having a total weight falling within a predetermined weight range, from the groups for which the objects to be weighed have been weighed, and configured to discharge, from the n discharge outlets, the objects to be weighed in the groups which are selected to form the n combinations.

16. A packaging apparatus comprising:

the link apparatus according to claim 10; and a packaging machine which successively conveys the package bags arranged in one line under the first area of the link apparatus.

17. A weighing and packaging system comprising:

the link apparatus according to claim 10;

a weighing machine having n (n: plural number) discharge outlets disposed above the first area of the link apparatus, the weighing machine being configured to sequentially discharge the objects to be weighed which have been weighed from the n discharge outlets to sequentially supply the objects to be weighed to every set of n chutes which are conveyed sequentially to the first area of the link apparatus; and a packaging machine which successively conveys the package bags arranged in one line under the first area of the link apparatus.

18. The weighing and packaging system according to claim 17, wherein the packaging machine includes plural funnels which are conveyed under the first area of the link apparatus in a state where the funnels are respectively inserted into the package bags and guide the objects to be weighed which have been discharged from the chutes of the link apparatus to inside of the package bags.

* * * * *

UNITED STATES PATENT AND TRADEMARK OFFICE
CERTIFICATE OF CORRECTION

PATENT NO. : 8,584,713 B2  
APPLICATION NO. : 12/531009  
DATED : November 19, 2013  
INVENTOR(S) : Shozo Kawanishi Page 1 of 1

It is certified that error appears in the above-identified patent and that said Letters Patent is hereby corrected as shown below:

On the Title Page:

Item (75) Inventor:

Delete "Shozo Kawanishi, Nishinomiya (JP)" and replace with -- Shozo Kawanishi, Nishinomiya-shi (JP) --.

Item (73) Assignee:

Delete "(73) Assignee: Shozo Kawanishi, Akashi-shi (JP)".

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,584,713 B2  
APPLICATION NO. : 12/531009  
DATED : November 19, 2013  
INVENTOR(S) : Shozo Kawanishi It is certified that error appears in the above-identified patent and that said Letters Patent is hereby corrected as shown below:

On the Title Page:

"item (75)" should read -- item (76) --.

Item (75) Inventor:

Delete "Shozo Kawanishi, Nishinomiya (JP)" and replace with -- Shozo Kawanishi, Nishinomiya-shi (JP) --.

Item (73) Assignee:

Delete "(73) Assignee: Shozo Kawanishi, Akashi-shi (JP)".

This certificate supersedes the Certificate of Correction issued June 17, 2014.

Signed and Sealed this  
Fifth Day of August, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,584,713 B2 Page 1 of 1
APPLICATION NO. : 12/531009
DATED : November 19, 2013
INVENTOR(S) : Shozo Kawanishi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this
Twenty-second Day of September, 2015

Michelle K. Lee
*Director of the United States Patent and Trademark Office*